(12) United States Patent
Yosui et al.

(10) Patent No.: US 9,582,693 B2
(45) Date of Patent: Feb. 28, 2017

(54) ANTENNA DEVICE AND COMMUNICATION TERMINAL DEVICE

(71) Applicant: Murata Manufacturing Co., Ltd., Nagaokakyo-shi, Kyoto-fu (JP)

(72) Inventors: Kuniaki Yosui, Nagaokakyo (JP); Hirokazu Yazaki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 73 days.

(21) Appl. No.: 14/192,894

(22) Filed: Feb. 28, 2014

(65) Prior Publication Data

US 2014/0176384 A1    Jun. 26, 2014

Related U.S. Application Data

(63) Continuation of application No. PCT/JP2013/065158, filed on May 31, 2013.

(30) Foreign Application Priority Data

Jun. 4, 2012  (JP) ................................ 2012-126990

(51) Int. Cl.
*G06K 7/10* (2006.01)
*G06K 19/077* (2006.01)
(Continued)

(52) U.S. Cl.
CPC ..... *G06K 7/10178* (2013.01); *G06K 19/07794* (2013.01); *H01Q 1/243* (2013.01);
(Continued)

(58) Field of Classification Search
None
See application file for complete search history.

(56) References Cited

U.S. PATENT DOCUMENTS

2007/0051807 A1*  3/2007  Yamaguchi .......... G06K 7/0008
                                                       235/451
2009/0315680 A1* 12/2009  Arimura .......... G06K 19/07749
                                                       340/10.1
(Continued)

FOREIGN PATENT DOCUMENTS

EP      2 573 871 A1    3/2013
JP    2005-134942 A     5/2005
(Continued)

OTHER PUBLICATIONS

Official Communication issued in International Patent Application No. PCT/JP2013/065158, mailed on Aug. 20, 2013.

*Primary Examiner* — Robert Karacsony
(74) *Attorney, Agent, or Firm* — Keating & Bennett, LLP (57) ABSTRACT

An antenna device includes a power feed coil antenna connected to a power feed circuit, and a booster coil antenna including wound coil conductors and disposed so as to be electromagnetically coupled to the power feed coil antenna. The power feed coil antenna includes a first coil antenna and a second coil antenna each including a coil conductor, and the coil conductors of the first and second coil antennas are connected in phase with each other. The first coil antenna is disposed such that the winding axis of the coil conductor of the first coil antenna extends perpendicularly or substantially perpendicularly to the winding axis of the booster coil antenna, and such that at least a portion of the first coil antenna overlaps the coil conductor of the booster coil antenna as viewed in plan. The second coil antenna is disposed in the vicinity of the coil conductors such that the winding axis of the coil conductor of the second coil antenna extends in parallel with the winding axis of the booster coil antenna, and such that at least a portion of a coil opening of (Continued)

the second coil antenna does not overlap the coil conductors of the booster coil antenna as viewed in plan.

19 Claims, 10 Drawing Sheets (51) Int. Cl.
*H01Q 7/08* (2006.01)
*H01Q 1/24* (2006.01)
*H01Q 7/00* (2006.01)
*H01Q 7/06* (2006.01)
*H01Q 1/36* (2006.01)

(52) U.S. Cl.
CPC ................. *H01Q 1/36* (2013.01); *H01Q 7/00* (2013.01); *H01Q 7/06* (2013.01); *H01Q 7/08* (2013.01)

(56) References Cited

U.S. PATENT DOCUMENTS

2013/0135172 A1* 5/2013 Ito .................... G06K 19/07794
343/867
2014/0035793 A1* 2/2014 Kato ..................... H01Q 1/243
343/867

FOREIGN PATENT DOCUMENTS

| JP | 2008-306689 A | | 12/2008 |
|---|---|---|---|
| JP | 2009112062 A | * | 5/2009 |
| JP | 4325621 B2 | | 9/2009 |
| WO | 2008/062828 A1 | | 5/2008 |
| WO | 2012/033031 A1 | | 3/2012 |

* cited by examiner

ANTENNA DEVICE AND COMMUNICATION TERMINAL DEVICE

BACKGROUND OF THE INVENTION

1. Field of the Invention

The present invention relates to an antenna device, for example, an antenna device for use in a system for non-contact communication such as NFC (near field communication), and to a communication terminal device including the antenna device.

2. Description of the Related Art

In recent years, portable terminals include a built-in antenna device for use in a non-contact communication system for a 13.56 MHz band. In order to achieve a long communication distance, this type of antenna device requires a large coil antenna, which is affixed to the inner side of a terminal case, in which a relatively large space is available. A power feed circuit (an RFIC chip) that processes an RF signal and the coil antenna are directly connected to each other via a connector or a pin.

However, the direct connection method discussed above poses a problem that the contact resistance is fluctuated in accordance with the roughness of the contact surface, oxidation, and the contact pressure, which leads to a problem in reliability such as a contact failure caused by vibration or an impact due to a fall.

Thus, Japanese Unexamined Patent Application Publication No. 2008-306689 and Japanese Patent No. 4325621 propose driving a transmission/reception antenna conducted with an RFIC chip mounted on a substrate through wiring on the substrate and a resonance antenna provided inside a terminal case, for example, with the transmission/reception antenna and the resonance antenna electromagnetically coupled to each other. With such techniques, not only can the problem described above be resolved, but also it is only necessary to couple the transmission/reception antenna to the resonance antenna, and therefore the size of the transmission/reception antenna may be reduced.

However, electromagnetic coupling between a booster coil antenna and a power feed coil antenna is not necessarily good enough because such coupling may involve generation of leakage magnetic flux or the like, which may degrade the communication characteristics.

SUMMARY OF THE INVENTION

Preferred embodiments of the present invention provide an antenna device and a communication terminal device in which the degree of coupling between a power feed coil antenna and a booster coil antenna is increased.

According to a first preferred embodiment of the present invention, an antenna device includes a power feed coil antenna connected to a power feed circuit, and a booster coil antenna including a wound coil conductor and disposed so as to be electromagnetically coupled to the power feed coil antenna, wherein the power feed coil antenna includes a first coil antenna and a second coil antenna each including a coil conductor, the coil conductor of the first coil antenna and the coil conductor of the second coil antenna being connected in phase with each other, the first coil antenna is disposed such that a winding axis of the coil conductor of the first coil antenna extends perpendicularly or substantially perpendicularly to a winding axis of the booster coil antenna, and such that at least a portion of the first coil antenna overlaps the coil conductor of the booster coil antenna as viewed in plan, and the second coil antenna is disposed in a vicinity of the coil conductor of the booster coil antenna such that a winding axis of the coil conductor of the second coil antenna extends parallel or substantially parallel to the winding axis of the booster coil antenna, and such that at least a portion of a coil opening of the second coil antenna does not overlap the coil conductor of the booster coil antenna as viewed in plan.

A second preferred embodiment of the present invention provides a communication terminal device including the antenna device, a housing, and a printed wiring board housed in the housing, wherein the power feed coil antenna is attached to the printed wiring board, and the booster coil antenna is attached to an inner side or an outer side of a cover that covers the housing, or embedded inside the cover using a resin molding technology.

In the antenna device, the power feed coil antenna preferably includes the first coil antenna and the second coil antenna, the first coil antenna is disposed with the winding axis of the coil conductor of the first coil antenna extending perpendicularly or substantially perpendicularly to the winding axis of the booster coil antenna, and the second coil antenna is disposed with the winding axis of the coil conductor of the second coil antenna extending parallel or substantially parallel to the winding axis of the booster coil antenna. Therefore, the power feed coil antenna is coupled to magnetic flux generated around the booster coil antenna without leakage, which improves the degree of coupling. This improves the communication characteristics.

According to various preferred embodiments of the present invention, the degree of coupling between the power feed coil antenna and the booster coil antenna is improved to improve the communication characteristics.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 12A and 12B show a communication terminal device according to another preferred embodiment of the present invention, in which

DETAILED DESCRIPTION OF THE PREFERRED EMBODIMENTS

An antenna device and a communication terminal device according to preferred embodiments of the present invention will be described below with reference to the accompanying drawings. In the drawings, common components and portions are denoted by the same reference symbols to omit overlapping description.

Figure 1:
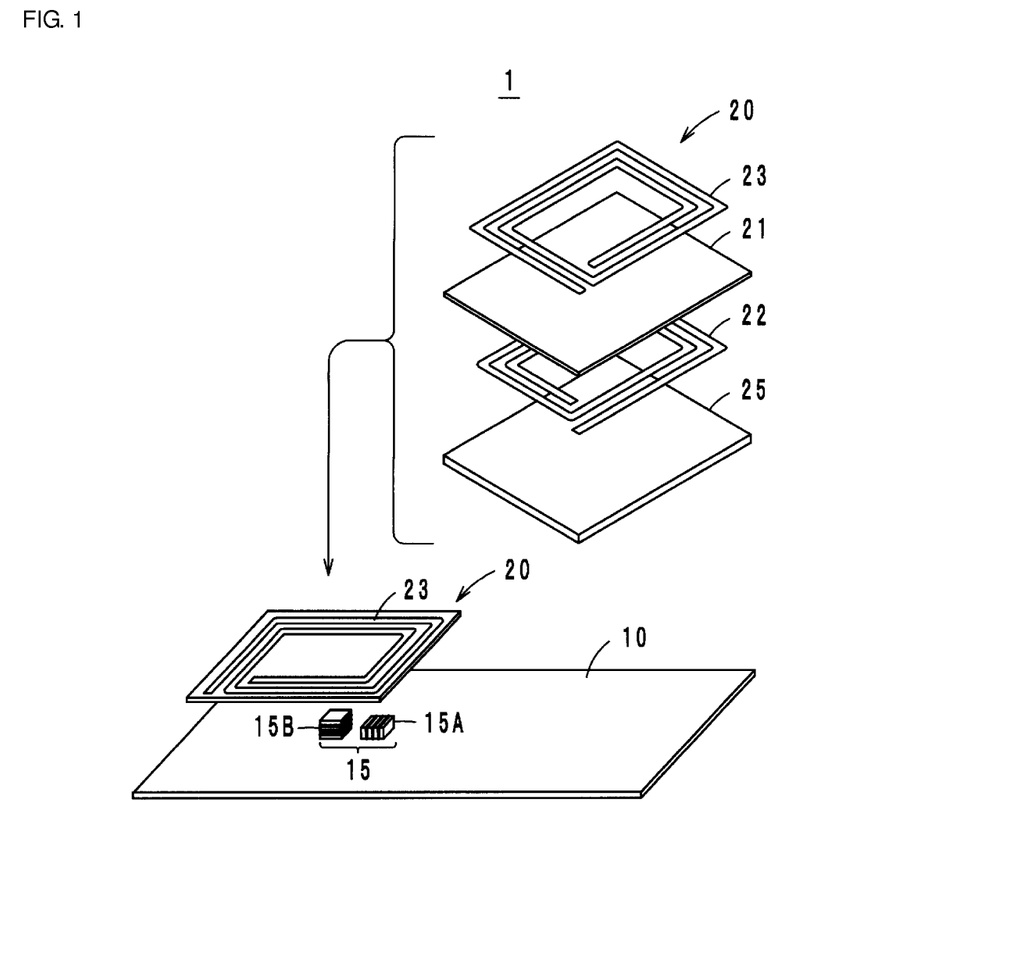
FIG. 1 is an exploded perspective view showing an antenna device according to a preferred embodiment of the present invention.
Figure 2:
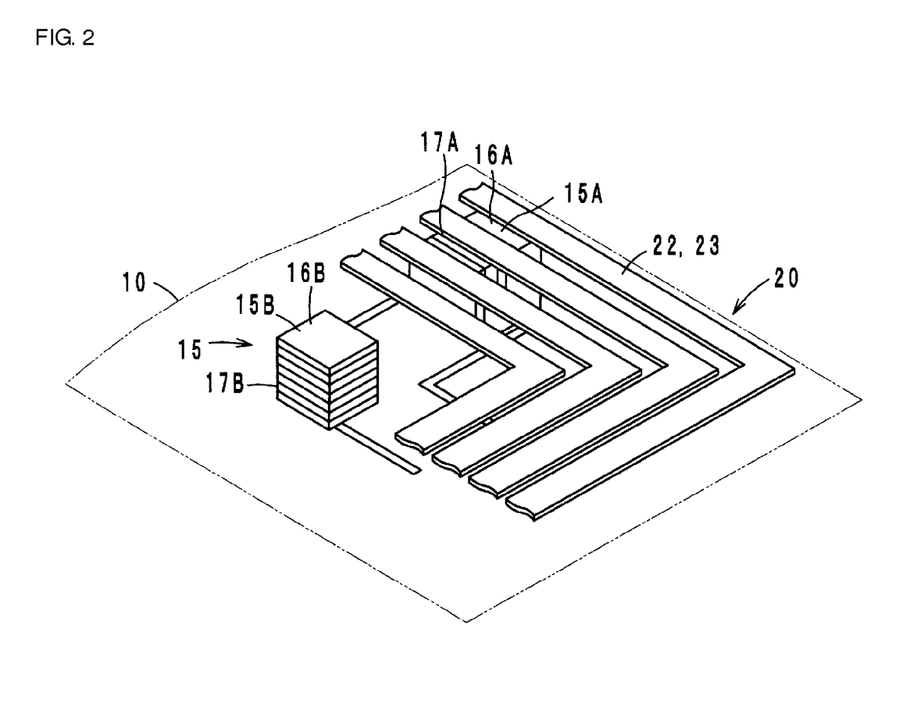
FIG. 2 is a perspective view showing the antenna device.

In an antenna device 1 according to a preferred embodiment of the present invention, as shown in FIGS. 1 and 2, a power feed coil antenna 15 (including a first coil antenna 15A and a second coil antenna 15B) is disposed on a circuit substrate (a printed wiring board 10), a booster coil antenna 20 in which coil conductors 22 and 23 are provided on the lower surface and the upper surface of an insulating layer 21 is provided, and the power feed coil antenna 15 is disposed in proximity to a surrounding side of the booster coil antenna 20. A magnetic layer 25 may be interposed at least partially between the booster coil antenna 20 and the printed wiring board 10. The booster coil antenna 20 functions as a radiating element capable of transmitting and receiving a high-frequency signal in the HF band.

Figure 3A:
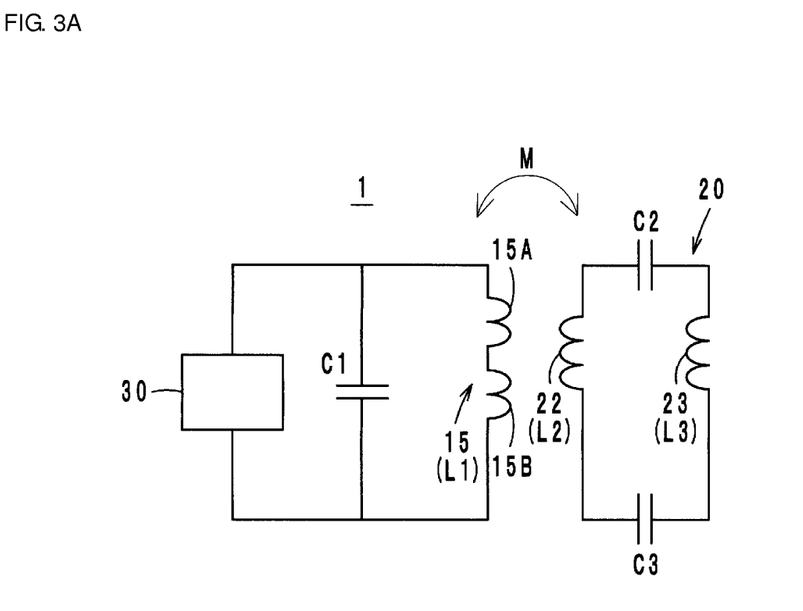
FIGS. 3A and 3B are each an equivalent circuit diagram of the antenna device.

The antenna device 1 has an equivalent circuit shown in FIG. 3A. The power feed coil antenna 15 (coil antennas 15A and 15B) is connected to a power feed circuit (an RFIC chip 30), and preferably includes an inductor component L1 (an inductor component synthesized from the coil antennas 15A and 15B) and a capacitor component C1 constituting a parallel resonant circuit. The resonance frequency is adjusted mainly by the capacitor component C1. Meanwhile, the booster coil antenna 20 defines a series resonant circuit including inductor components L2 and L3 and line capacitor components C2 and C3 of the coil conductors and 23. The power feed coil antenna 15 (the inductor component L1) and the booster coil antenna 20 (the inductor components L2 and L3) are electromagnetically coupled to each other (as indicated by the symbol M).

The power feed circuit preferably includes the RFIC chip 30, a memory circuit and a logic circuit. The power feed circuit may be constituted as a bare chip IC, or may be constituted as a package IC.

Figure 3B:
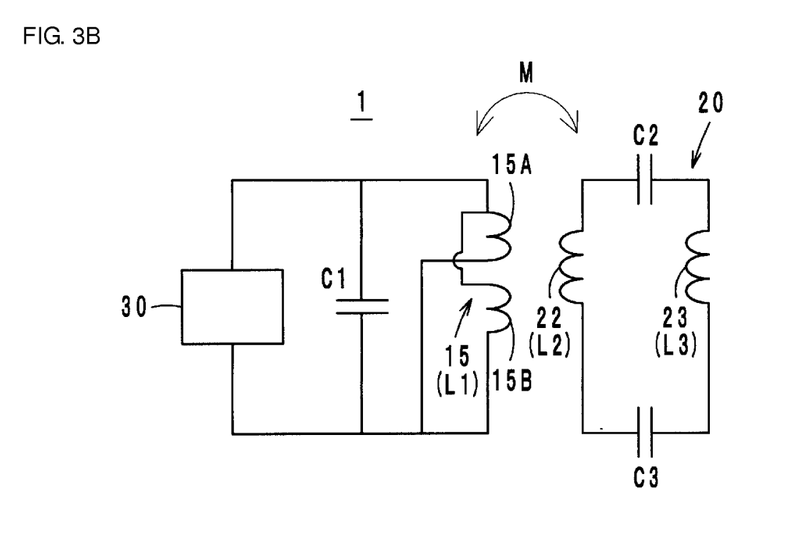

The coil antenna 15A, 15B preferably includes a magnetic core 16A, 16B and a coil conductor 17A, 17B wound around the magnetic core 16A, 16B. The coil conductors 17A and 17B are connected in phase in series or parallel with each other via a conductor located on the printed wiring board 10 (see FIGS. 3A and 3B). The first coil antenna 15A is disposed such that the winding axis of the coil conductor 17A extends perpendicularly or substantially perpendicularly to the winding axis of the booster coil antenna 20, and such that at least a portion of the coil antenna 15A itself overlaps the coil conductors 22 and 23 of the booster coil antenna 20 as viewed in plan. The second coil antenna 15B is disposed in the vicinity of the coil conductors 22 and 23 such that the winding axis of the coil conductor 17B extends parallel or substantially parallel to the winding axis of the booster coil antenna 20, and such that at least a portion of a coil opening of the second coil antenna 15B does not overlap the coil conductors 22 and 23 of the booster coil antenna 20 as viewed in plan.

In order for the winding axis of the coil conductor 17A to extend perpendicularly or substantially perpendicularly to the winding axis of the booster coil antenna 20, it is not necessary that the winding axes intersect each other exactly by an angle of 90°. If the winding axes intersect each other by an angle in the range of about 90°±30°, for example, the degree of coupling described below is increased. In order for the winding axis of the coil conductor 17B to extend parallel or substantially parallel to the winding axis of the booster coil antenna 20, meanwhile, it is not necessary that the winding axes are disposed at an angle of 180°. If the winding axes are disposed at an angle in the range of about 180°±30°, for example, the degree of coupling described below is increased.

The magnetic cores 16A and 16B are normally made of ferrite. The coil conductors 17A and 17B may be formed as a thin film from a conductive material by a photolithography method or the like, formed as a thick film using a conductive paste, or formed by winding a conductive wire. The coil conductors 22 and of the booster coil antenna 20 preferably are formed as a thin film from a conductive material by a photolithography method on the insulating layer 21, but are not limited thereto. Although not shown, respective first end portions of the coil conductors 22 and 23 may be connected to each other by an interlayer connection conductor such as a via (with respective second end portions unconnected) such that a current flows in the same direction, for example. The booster structure described above uses the line capacitances of the coil conductors 22 and 23, the coil conductors may include a single layer, and a first end portion and a second end portion of the coil conductors may be connected to each other by a capacitor element, for example.

Figure 4A:
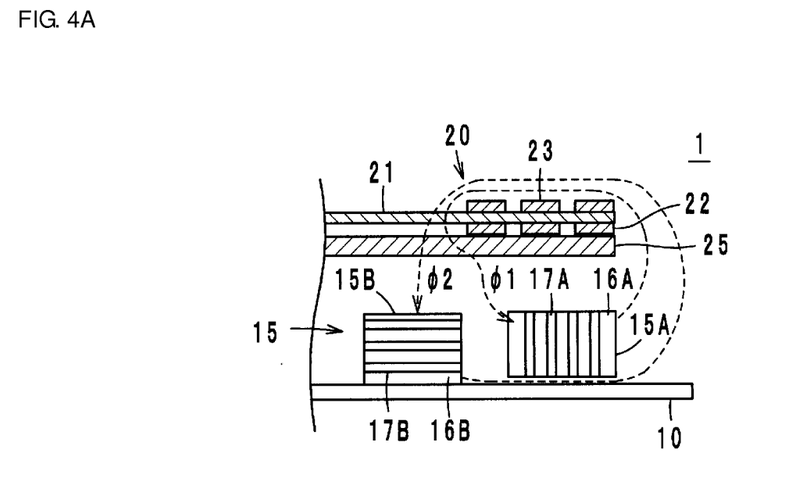
FIG. 4A is an illustration showing electromagnetic coupling between a power feed coil antenna and a booster coil antenna in the antenna device.
Figure 4B:
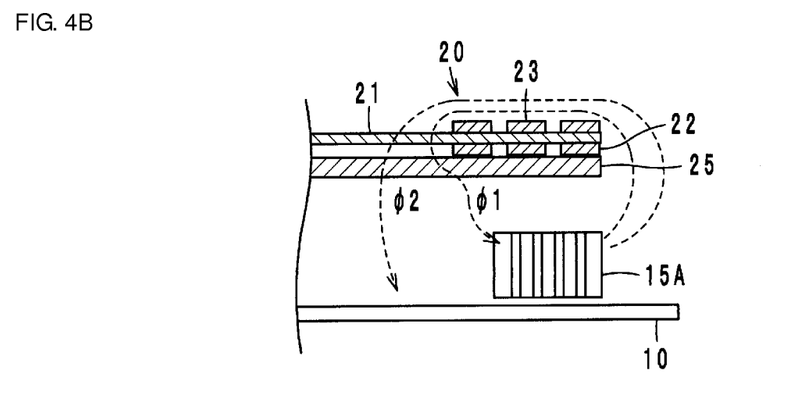
FIGS. 4B and 4C are illustrations showing electromagnetic coupling between a first coil antenna alone and the booster coil antenna and between a second coil antenna alone and the booster coil antenna, respectively.
Figure 4C:
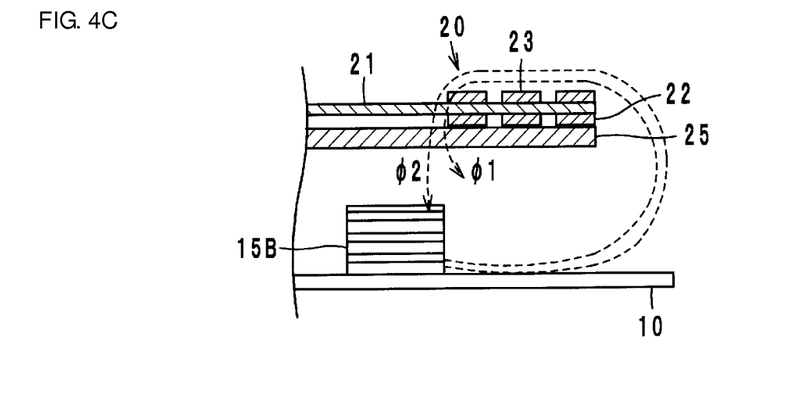

In the antenna device 1, the power feed coil antenna 15 preferably includes the first coil antenna 15A and the second coil antenna 15B. As shown in FIG. 4A, magnetic flux $\phi 1$ generated inside the booster coil antenna 20 is mainly coupled to the first coil antenna 15A to define a closed loop to establish electromagnetic coupling, and magnetic flux $\phi 2$ generated outside the booster coil antenna 20 is mainly coupled to the second coil antenna 15B to define a closed loop to establish electromagnetic coupling. If only the first coil antenna 15A were provided, the magnetic flux $\phi 2$ generated outside the booster coil antenna 20 would be leakage magnetic flux as shown in FIG. 4B. If only the second coil antenna 15B were provided, the magnetic flux $\phi 1$ generated inside the booster coil antenna 20 would be leakage magnetic flux as shown in FIG. 4C. In the antenna device 1, the magnetic fluxes $\phi 1$ and $\phi 2$ define a closed loop, which increases the degree of coupling between the power feed coil antenna 15 and the booster coil antenna 20 and hence improves the communication characteristics.

In order to increase the degree of coupling with the booster coil antenna 20, the first coil antenna 15A is preferably disposed so as to overlap the coil conductors 22 and 23 of the booster coil antenna 20 as viewed in plan. In addition, the second coil antenna 15B is preferably disposed in proximity to an inner peripheral edge portion or an outer peripheral edge portion of the coil conductors 22 and 23 of the booster coil antenna 20. Further, the resonance frequency of the power feed coil antenna 15 may be adjusted in accordance with the arrangement relationship between the first coil antenna 15A and the second coil antenna 15B or the like. That is, the total inductance value may be changed in accordance with the arrangement relationship between the coil antennas 15A and 15B.

If communication is performed with only the booster coil antenna 20, a null point at which a failure occurs in communication may be generated. By disposing the coil antennas 15A and 15B separately as in the antenna device 1, it is possible to prevent generation of a null point by adjusting the resonance frequency in accordance with the arrangement relationship.

Figure 5:
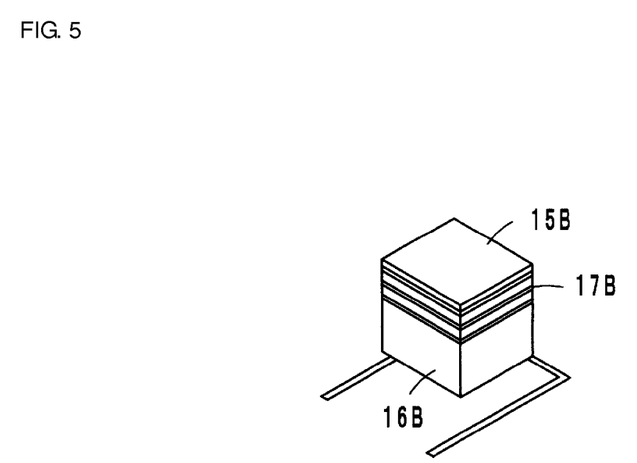
FIG. 5 is a perspective view showing a first modification of the second coil antenna according to a preferred embodiment of the present invention.

In the second coil antenna 15B, as shown in FIG. 5, the coil conductor 17B may be unevenly distributed to be wound around a portion (upper portion) that is proximate to the booster coil antenna 20 (a first modification of a preferred embodiment of the present invention). This configuration allows the magnetic flux $\phi 2$ to be easily released from the second coil antenna 15B, which reduces unwanted coupling with the circuit substrate 10. As a result, the degree of coupling between the booster coil antenna 20 and the second coil antenna 15B through the magnetic flux $\phi 2$ is increased.

Figure 6:
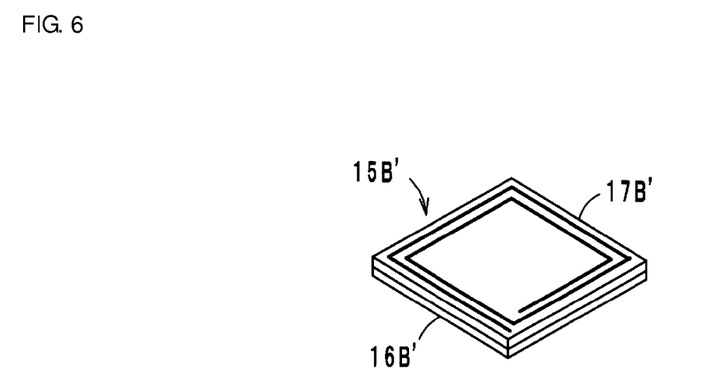
FIG. 6 is a perspective view showing a second modification of the second coil antenna according to a preferred embodiment of the present invention.

Meanwhile, the second coil antenna may be a coil antenna 15B' in which a coil conductor 17B' in a flat spiral shape is located on a surface of a substrate 16B' which is an insulating substrate affixed onto a ferrite plate (a second modification) as shown in FIG. 6. The insulating substrate may be a flexible substrate such as a polyimide, LCP, or PET film, or may be a solid substrate made of a glass epoxy resin or the like.

Figure 7:
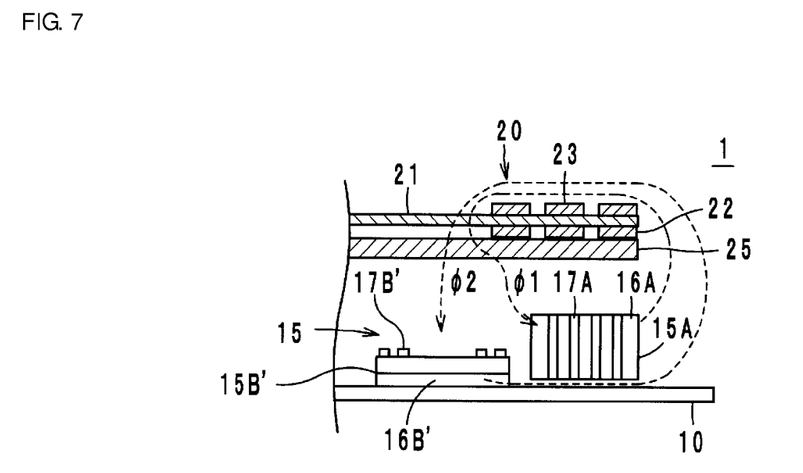
FIG. 7 is an illustration showing electromagnetic coupling between a power feed coil antenna and a booster coil antenna in an antenna device including the second coil antenna according to the second modification shown in FIG. 6.

The electromagnetic coupling with the booster coil antenna 20 for a case where the second coil antenna 15B' is used is as described in relation to FIG. 4A. That is, as shown in FIG. 7, magnetic flux $\phi 1$ generated inside the booster coil antenna 20 is mainly coupled to the first coil antenna 15A to define a closed loop to establish electromagnetic coupling, and magnetic flux $\phi 2$ generated outside the booster coil antenna 20 is mainly coupled to the second coil antenna 15B' to define a closed loop to establish electromagnetic coupling.

In the second coil antenna 15B', the coil conductor 17B' is drawn planarly on a single-layer insulating substrate by a photolithography method. Besides, the substrate 16B' may be a multi-layer substrate, and the coil conductor 17B' may be arranged spirally inside the multi-layer substrate. With the coil antenna 15B' in which the coil conductor 17B' is arranged planarly on the substrate 16B', it is difficult to reduce the mounting area as with the coil antenna 15B which uses the ferrite core 16B shown in FIG. 2, but micromachining of the coil conductor 17B' is facilitated.

Figure 8A:
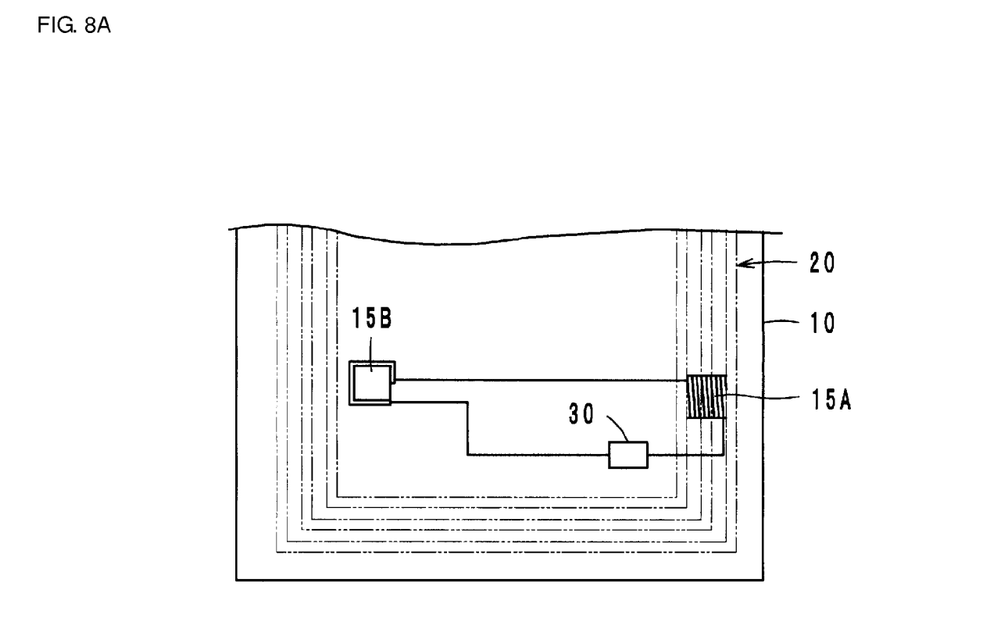
FIGS. 8A and 8B are plan views showing a first modification and a second modification, respectively, of the arrangement relationship of the power feed coil antenna according to a preferred embodiment of the present invention.
Figure 8B:
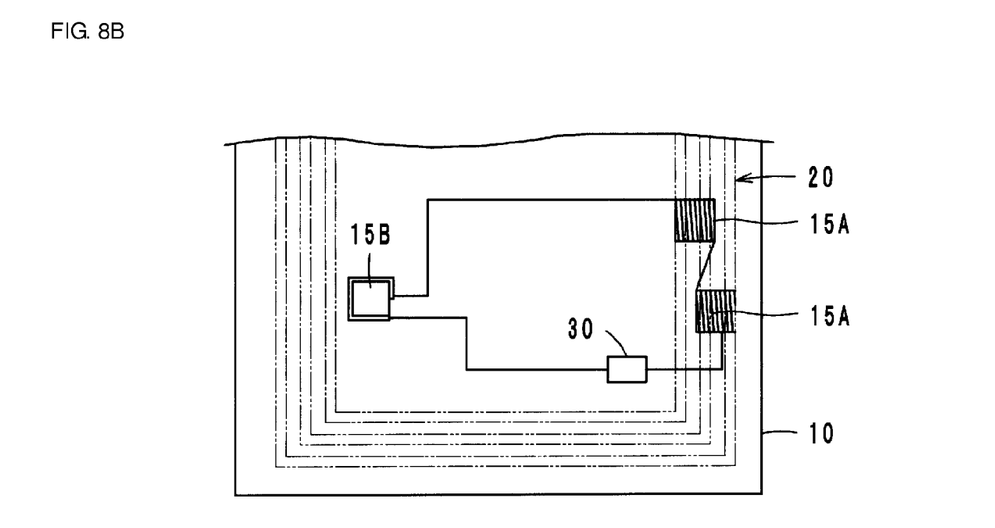

The coil antennas 15A and 15B may be disposed remotely so as to be coupled to two sides of the booster coil antenna 20, respectively, as shown in FIG. 8A. Alternatively, two first coil antennas 15A may be provided as shown in FIG. 8B. Although not shown, two second coil antennas 15B may be provided. A plurality of, that is, two or more, coil antennas 15A and 15B may be provided.

Figure 9:
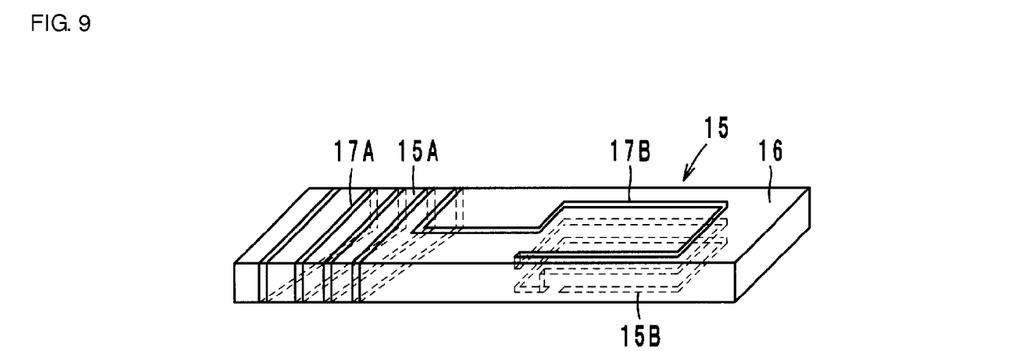
FIG. 9 is a perspective view showing a second example of the power feed coil antenna according to a preferred embodiment of the present invention.

In the power feed coil antenna 15, as shown in FIG. 9, the magnetic core 16 may be a single stacked object, and the coil conductor 17A may be wound on one side of the core 16 to serve as the first coil antenna 15A and the coil conductor 17B may be built in the other side of the core 16 to serve as the second coil antenna 15B. In this case, the coil conductor 17B preferably has a coil configuration defined by connecting conductors located on stacked sheets through via-hole conductors.

Figure 10:
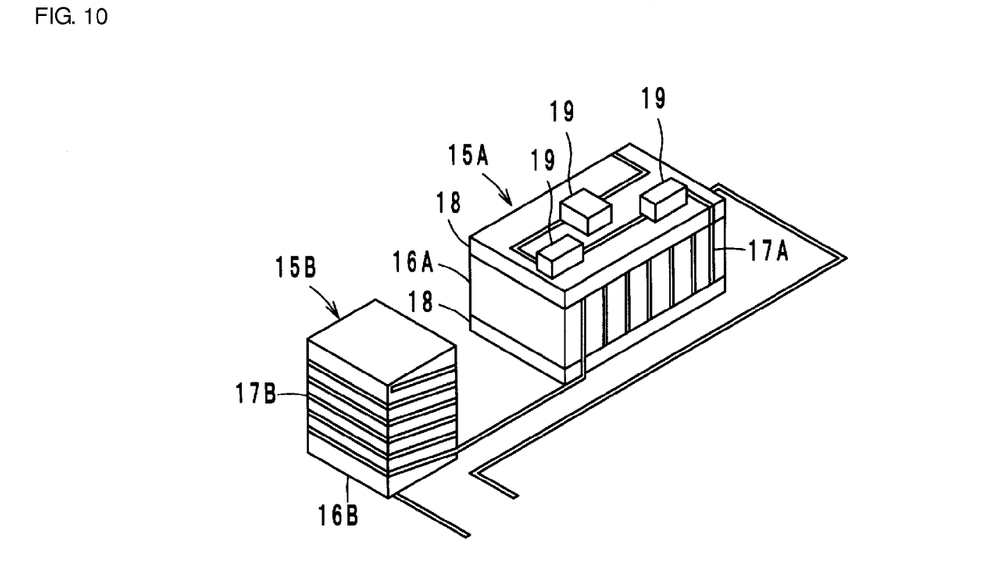
FIG. 10 is a perspective view showing a third example of the power feed coil antenna according to a preferred embodiment of the present invention.

Further, in the case where a chip component is mounted on the power feed coil antenna 15, the chip component preferably does not cover opening portions of the coil antennas 15A and 15B. That is, as shown in FIG. 10, a non-magnetic layer 18 is stacked on each of the upper and lower surfaces of the magnetic core 16A of the first coil antenna 15A, and chip components 19 are mounted on the non-magnetic layer 18 on the upper surface side.

The non-magnetic layer 18 may be a dielectric. Alternatively, the non-magnetic layer 18 may be a magnetic body with low magnetic permeability, or a magnetic body with its Curie temperature lower than the use temperature.

Figure 11A:
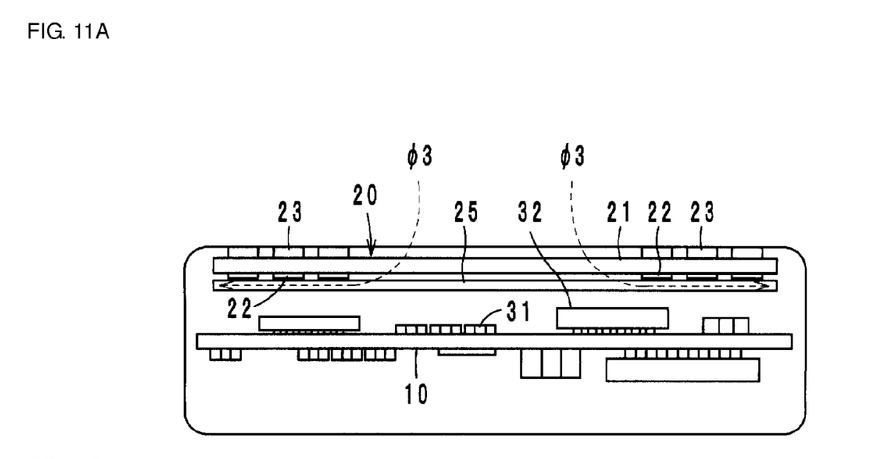
FIG. 11A is an illustration showing the function of a magnetic layer.
Figure 11B:
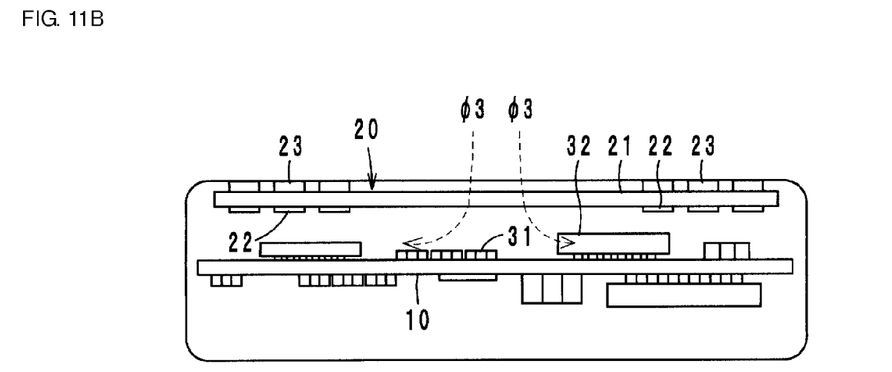
FIG. 11B is an illustration of a comparative example.

In the antenna device 1, the magnetic layer 25 is disposed between the power feed coil antenna 15 and the booster coil antenna 20. The function of the magnetic layer 25 will be described with reference to FIG. 11. Ferrite is suitably used as the magnetic layer 25.

FIG. 11 shows a schematic internal configuration of a portable terminal, in which a variety of electronic components 31 and ICs 32 are mounted on the printed wiring board 10 besides the power feed coil antenna 15. If the magnetic layer 25 were not provided, magnetic flux $\phi 3$ passing through the booster coil antenna 20 would collide with the electronic components 31 and the ICs 32 as shown in FIG. 11B. With the magnetic layer 25 provided, in contrast, magnetic flux $\phi 3$ is drawn into the magnetic layer 25 as shown in FIG. 11A, which significantly suppresses interference with the electronic components 31 and the ICs 32 to improve the communication characteristics.

Figure 12A:
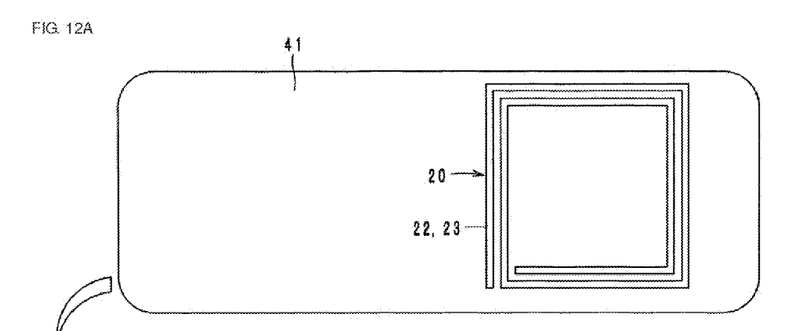
FIG. 12A is a back view of a housing cover and FIG. 12B is a plan view showing the inside of a housing body.
Figure 12B:
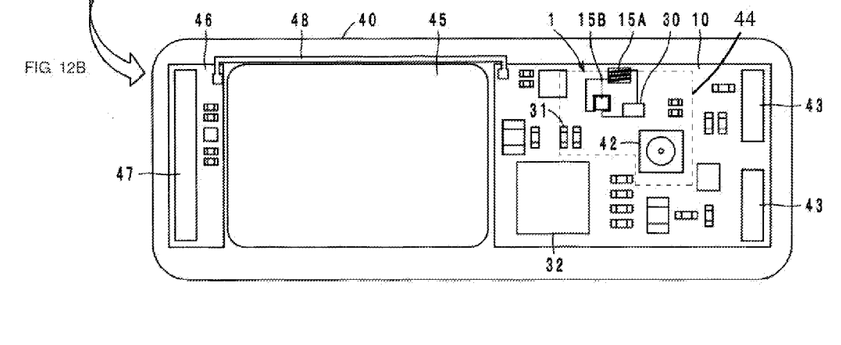

Next, a structure according to a preferred embodiment of the present invention in which the antenna device 1 is incorporated into a portable terminal will be described with reference to FIG. 12. The booster coil antenna 20 is affixed to the back surface side of a housing cover 41. The printed wiring board 10 is housed in a housing body 40, and the coil antennas 15A and 15B and the RFIC chip 30 are mounted on the printed wiring board 10.

A camera 42, the electronic components 31 and the ICs shown in FIG. 11, UHF-band antennas 43, and so forth are further mounted on the printed wiring board 10. A battery pack and a printed wiring board 46 are further mounted in the housing body 40, and a UHF-band antenna 47 etc. are mounted on the printed wiring board 46. A coaxial cable 48 connects between the printed wiring boards 10 and 46.

A conductive layer 44 may be disposed on a portion of the printed wiring board 10 at least facing the inner side of the coil antenna 15A and the booster coil antenna 20. Leakage magnetic flux from the booster coil antenna 20 is absorbed by a ground conductor to avoid affecting other components. Such a conductive layer 44 is not limited to a ground conductor provided on the printed wiring board 10, and may include a metal foil, a liquid crystal panel, a battery pack, a shield case, or the like, for example.

Figure 13:
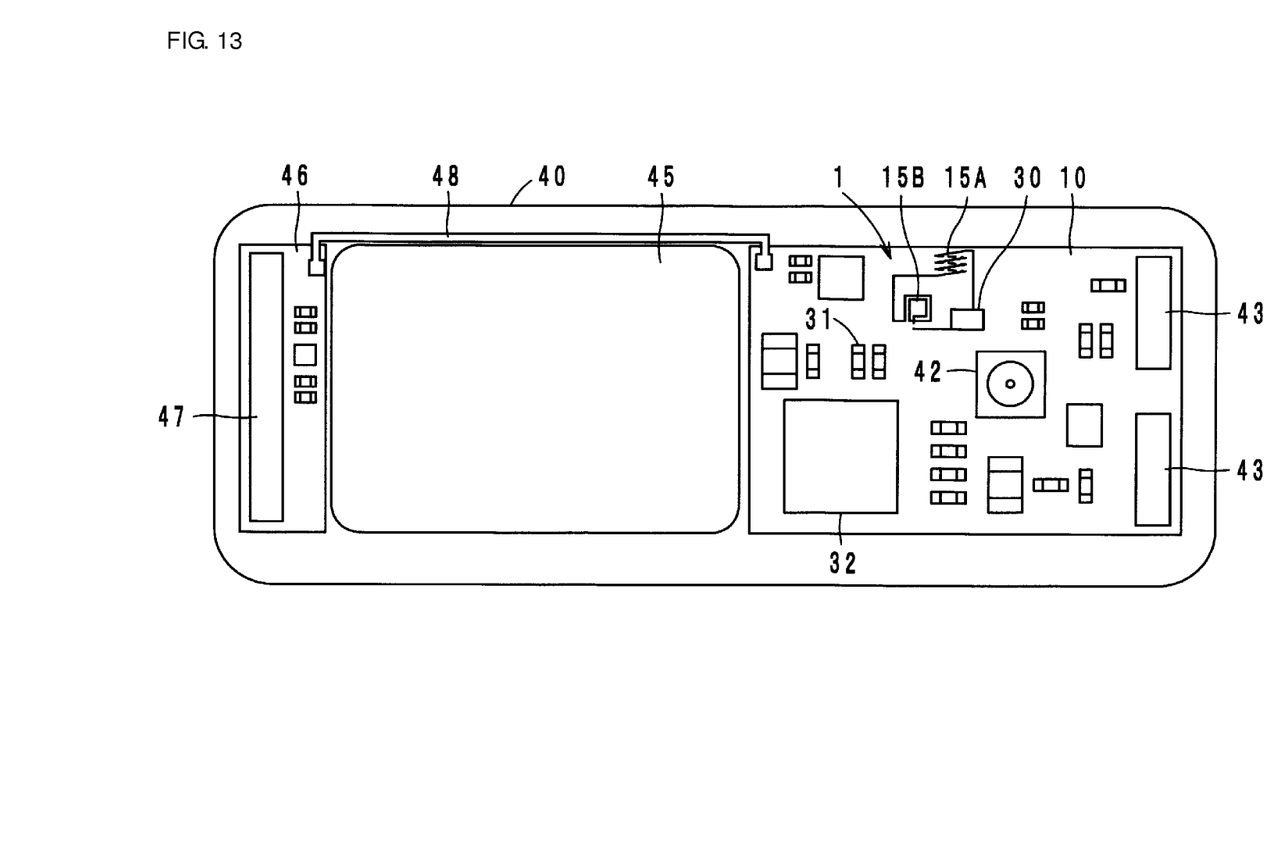
FIG. 13 is a plan view showing the inside of a housing body in a communication terminal device according to another preferred embodiment of the present invention.

A portable terminal according to another preferred embodiment of the present invention will be described with reference to FIG. 13. Here, the first coil antenna 15A and the second coil antenna 15B are directly provided on the printed wiring board 10. That is, the first coil antenna 15A is arranged spirally inward from a surface of the printed wiring board 10, and the second coil antenna 15B is arranged planarly on the surface of the printed wiring board 10. This eliminates the need for the ferrite cores 16A and 16B.

The antenna device and the communication terminal device according to the present invention are not limited to the preferred embodiments described above, and may be modified variously without departing from the scope and spirit of the present invention.

In particular, the specific configuration, shape, and so forth of the power feed coil antenna and the booster coil antenna may be determined as desired. In addition, the present invention is not limited to an antenna device for NFC in the HF band, and may be utilized for other frequency bands such as the UHF band and other communication systems, for example.

As has been described above, preferred embodiments of the present invention are useful for an antenna device and a communication terminal device, and particularly excellent in increasing the degree of coupling between a power feed coil antenna and a booster coil antenna.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
    a power feed coil antenna connected to a power feed circuit; and
    a booster coil antenna including a wound coil conductor and disposed so as to be electromagnetically coupled to the power feed coil antenna; wherein
    the power feed coil antenna and the booster coil antenna are disposed within a same housing;
    the power feed coil antenna includes a first coil antenna and a second coil antenna each including a coil conductor, the coil conductor of the first coil antenna and the coil conductor of the second coil antenna being connected in phase with each other;
    the first coil antenna is disposed such that a winding axis of the coil conductor of the first coil antenna extends perpendicularly or substantially perpendicularly to a winding axis of the booster coil antenna, and such that at least a portion of the first coil antenna overlaps the coil conductor of the booster coil antenna as viewed in plan view; and
    the second coil antenna is disposed such that a winding axis of the coil conductor of the second coil antenna extends parallel or substantially parallel to the winding axis of the booster coil antenna, and in a vicinity of the coil conductor of the booster coil antenna such that at least a portion of a coil opening of the second coil antenna does not overlap the coil conductor of the booster coil antenna as viewed in plan view.

2. The antenna device according to claim 1, wherein the first coil antenna and the second coil antenna are electromagnetically coupled to each other.

3. The antenna device according to claim 1, wherein the coil conductors of the first coil antenna and the second coil antenna are connected in series or parallel with each other.

4. The antenna device according to claim 1, wherein at least one of the first coil antenna and the second coil antenna includes a magnetic core.

5. The antenna device according to claim 1, wherein each of the first coil antenna and the second coil antenna includes a magnetic core, and the magnetic cores of the first coil antenna and the second coil antenna are disposed separately for the first coil antenna and the second coil antenna.

6. The antenna device according to claim 4, wherein the magnetic core is a single stacked object, and the coil conductor of the first coil antenna is wound on one side of the core to serve as the first coil antenna and the coil conductor of the second coil antenna is built in another side of the core to serve as the second coil antenna.

7. The antenna device according to claim 1, wherein the coil conductor of the second coil antenna is unevenly distributed to be wound around a portion that is proximate to the booster coil antenna.

8. The antenna device according to claim 1, wherein a magnetic layer is disposed between the power feed coil antenna and the booster coil antenna.

9. The antenna device according to claim 1, wherein a chip component is disposed so as not to cover opening portions of the first coil antenna and the second coil antenna.

10. A communication terminal device comprising:
    the antenna device according to claim 1;
    the housing which includes a housing body and a housing cover; and
    a printed wiring board housed in the housing body; wherein
    the power feed coil antenna is attached to the printed wiring board; and
    the booster coil antenna is attached to the housing cover.

11. The communication terminal device according to claim 10, wherein a conductive layer is disposed on a portion of the printed wiring board at least facing an inner side of the first coil antenna and the booster coil antenna.

12. The communication terminal device according to claim 10, wherein the first coil antenna and the second coil antenna are electromagnetically coupled to each other.

13. The communication terminal device according to claim 10, wherein the coil conductors of the first coil antenna and the second coil antenna are connected in series or parallel with each other.

14. The communication terminal device according to claim 10, wherein at least one of the first coil antenna and the second coil antenna includes a magnetic core.

15. The communication terminal device according to claim 10, wherein each of the first coil antenna and the second coil antenna includes a magnetic core, and the magnetic cores of the first coil antenna and the second coil antenna are disposed separately for the first coil antenna and the second coil antenna.

16. The communication terminal device according to claim 14, wherein the magnetic core is a single stacked object, and the coil conductor of the first coil antenna is wound on one side of the core to serve as the first coil antenna and the coil conductor of the second coil antenna is built in another side of the core to serve as the second coil antenna.

17. The communication terminal device according to claim 10, wherein the coil conductor of the second coil antenna is unevenly distributed to be wound around a portion that is proximate to the booster coil antenna.

18. The communication terminal device according to claim 10, wherein a magnetic layer is disposed between the power feed coil antenna and the booster coil antenna.

19. The communication terminal device according to claim 10, wherein a chip component is disposed so as not to cover opening portions of the first coil antenna and the second coil antenna.

* * * * *